United States Patent [19]

Jackson et al.

[11] Patent Number: 4,662,548
[45] Date of Patent: * May 5, 1987

[54] PANNIER AND MOUNTING ARRANGEMENT FOR CYCLES

[75] Inventors: W. Shaun Jackson, Ann Arbor; Leslie E. Bohm, Southfield, both of Mich.

[73] Assignee: Eclipse, Inc., Ann Arbor, Mich.

[*] Notice: The portion of the term of this patent subsequent to Dec. 6, 2000 has been disclaimed.

[21] Appl. No.: 384,840

[22] Filed: Jun. 4, 1982

Related U.S. Application Data

[63] Continuation-in-part of Ser. No. 339,273, Jan. 15, 1982, Pat. No. 4,418,850, which is a continuation of Ser. No. 84,400, Oct. 24, 1979, abandoned, which is a continuation-in-part of Ser. No. 768,467, Feb. 14, 1977, Pat. No. 4,174,795.

[51] Int. Cl.$^4$ .............................................. B62J 9/00
[52] U.S. Cl. .................................... 224/32 A; 150/49; 224/33 R
[58] Field of Search ............. 150/49; 224/30 R, 30 A, 224/32 R, 32 A, 33 R, 33 A, 36

[56] References Cited

U.S. PATENT DOCUMENTS

| | | | |
|---|---|---|---|
| 624,669 | 5/1899 | Moore | 224/33 A |
| 2,428,906 | 10/1947 | Cannella | 294/145 |
| 2,956,324 | 10/1960 | Klein | 24/230 BC |
| 3,145,408 | 8/1964 | Hertzel et al. | 150/49 X |
| 3,256,919 | 6/1966 | Osletree | 224/32 A |
| 3,716,938 | 2/1973 | Ammons | 150/49 X |
| 3,934,770 | 1/1976 | Larsen | 224/33 R |

FOREIGN PATENT DOCUMENTS

| | | | |
|---|---|---|---|
| 599075 | 6/1934 | Fed. Rep. of Germany | 224/32 A |
| 242067 | 4/1946 | Switzerland | 224/32 A |
| 11600 | of 1913 | United Kingdom | 150/49 |
| 340702 | 1/1931 | United Kingdom | 150/49 |
| 734278 | 7/1955 | United Kingdom | 224/32 A |

Primary Examiner—Allan N. Shoap
Attorney, Agent, or Firm—Krass & Young

[57] ABSTRACT

A pannier for a cycle adapted to be secured to a carrier rack mounted over a wheel. A flexible, generally rectangular bag is of sufficient size that its rear portion extends downwardly from the carrier closely adjacent to the spokes of the wheel. A rigid panel fixed to the rear of the bag and extending substantially to the bottom of the bag is utilized to provide structural definition for the bag and to prevent it from interfering with the spokes. A U-shaped bar having opposed ends pivotally connected to the rear panel is employed for holding the bag in an open or collapsed condition. In one embodiment a second panel extends substantially across the bottom of the bag and is pivotally connected to the lower edge of the first panel to provide lateral stability for the bag. The opposed ends of the bar may be utilized as pivot pins for both the panels and the bar.

13 Claims, 5 Drawing Figures

4,662,548

PANNIER AND MOUNTING ARRANGEMENT FOR CYCLES

CROSS REFERENCE TO RELATED APPLICATIONS

This application is a Continuation-In-Part of U.S. Ser. No. 339,273, filed Jan. 15, 1982, now U.S. Pat. No. 4,418,850, which is a Continuation of U.S. Ser. No. 84,400, filed Oct. 24, 1979 (now abandoned), which is a Continuation-In-Part of U.S. Ser. No. 768,467, filed Feb. 14, 1977, now U.S. Pat. No. 4,174,795.

TECHNICAL FIELD

This invention relates to panniers for cycle vehicles adapted to be secured to a carrier rack mounted over a wheel and to mounting arrangements for such panniers.

BACKGROUND ART

The number of people experiencing the enjoyment of touring on bicycles or motorcycles has been steadily increasing over the years. Similarly, cycles have replaced the use of automobiles for travelling to work, school, the grocery store and other places where it is necessary for the rider to carry various objects on the cycle to and from his destination. Panniers, as they are referred to in the trade, may take various forms such as saddle bags, packs, baskets and the like. One of the most convenient places for mounting panniers is on a carrier rack secured over the rear wheel of the cycle.

The use of conventional panniers and their associated mounting arrangements have, unfortunately, lead to some problems when mounted on the rear carrier rack. It is generally desirable for the panniers to be of a relatively large size so as to hold a large quantity of objects while at the same time being lightweight for ease of carrying it both on and off the cycle. To accomplish these objectives many panniers are bags made of flexible, lightweight sheet material. When mounted on the rear carrier rack such panniers lack structural definition. Consequently, it is possible for the flexible rear portion of the bag to interfere with the spokes of the wheel. While it has been suggested to laterally space the bags a sufficient distance away from the wheel to prevent such interference, this approach frustrates a compact design objective reducing stability and manuverability of the cycle.

Another problem with flexible bag panniers is that they have a tendency to sag, making it difficult to load and unload objects from its top. Also, the load distribution of the objects in the bag often becomes uneven which may result in an unpredictable sway of the bag caused by shifts in the load.

The wind resistance or drag created by the panniers is also to be considered since the rider must expend more energy to overcome such forces. The durability of the bag and its associated mounting arrangement is likewise important. And from the manufacturer's standpoint, it is extremely desirable to provide a good quality product while at the same time minimizing manufacturing costs. The reliability of the pannier and production efficiency both can be increased by keeping the number of individual components necessary to complete the system to a minimum. The present invention is directed to solving one or more of those problems while achieving the objectives noted above.

SUMMARY OF THE INVENTION

One aspect of the present invention contemplates a pannier for a cycle adapted to be secured to a carrier rack mounted over a spoked wheel. A relatively large flexible bag is employed having a rear portion of sufficient length that it extends downwardly from the carrier to a position closely adjacent to the wheel. A rigid, substantially solid panel fixed to the rear of the bag extends substantially to the bottom thereof. The panel serves to prevent the flexible rear portion of the bag from interfering with the spokes. A U-shaped bar has its opposite ends pivotally mounted to spaced points on opposite sides of the panel and a central section secured to the top forward edge of the bag. With the bar disposed in an inclined position relative to the panel the bag is held in an extended condition to aid in loading/unloading the bag and to evenly distribute the load in a manner to be explained herein. In a collapsed position with the bar pivoted adjacent to the panel the bag is in a compact design reducing wind resistance.

In a particular embodiment, a second panel extending substantially across the bottom of the bag provides lateral stability therefore. The rear edge of the second panel is pivotally connected to the lower edge of the rear panel so that the second panel may likewise be pivoted adjacent to the rear panel when the bag is in a collapsed position. Preferably, one of the panels includes a bent edge covering the edge of the other panel to provide a smooth corner protecting the bag from damage. Preferably, the lower edge of the rear panel is bent inwardly and provides support for the second panel when folded open. The bag may take the form of an open ended receptacle made of mesh or net like material to aid in collapsability of the bag while at the same time minimizing manufacturing costs.

One particularly advantageous feature disclosed herein is the use of the opposite ends of the bar as pivot shafts or pins for pivotally connecting the two panels together.

BRIEF DESCRIPTION OF THE DRAWINGS

Still other unique features and advantages of the present invention will become apparent upon reading the following specification and by reference to the drawings in which.

DESCRIPTION OF THE PREFERRED EMBODIMENT

The several aspects of the present invention will be described in connection with a particular pannier arrangement employing a given bag construction. However, it should be kept in mind that the general concepts of the internal frame construction to be described may be utilized with different types of bags such as the saddlebags disclosed in U.S. Pat. No. 4,174,795 and U.S.

Ser. No. 339,273 which are hereby incorporated by reference.

Figure 4:
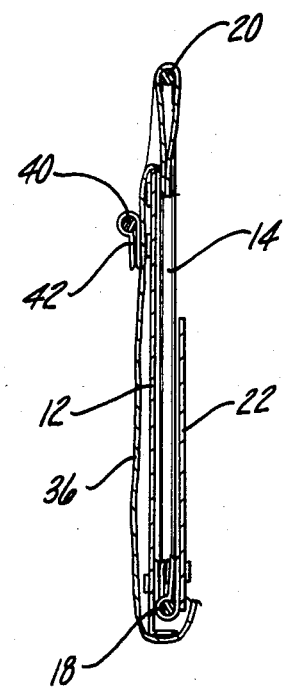
FIG. 4 is a cross-sectional view showing the pannier in a collapsed condition.

In its broadest aspect the present invention contemplates an internal frame 10, the major components thereof being made of light-weight aluminum. Frame 10 includes a rigid substantially solid panel 12 of the type shown in FIG. 1. Panel 12 is adapted to be fixed to the rear of its associated bag and extends substantially to the bottom of the bag so as to prevent the bag from interfering with the spokes 11 (FIG. 2) of the rear wheel 13 of the bicycle 15 on which the bag is mounted. A U-shaped bar 14 has opposed ends 16 and 18 pivotally mounted to spaced points on opposite sides of the panel 12. Bar 14 has a central horizontally extending section 20 adapted to be secured to a top forward edge of the bag. Bar 14 may be disposed in an inclined position relative to panel 12 to aid in loading/unloading the bag and promoting even distribution of the loads therein. With bar 14 in the position shown in FIG. 3, the flexible fabric of the bag is in tension and bar 14 serves to transfer the load back to the entirety of the rigid stiffener panel 12. This is in contrast to known pannier arrangements where only a few points bear the entire load. The present invention thus effectively eliminates sagging of the bag and unexpected shifts in the load. Bar 14 may be pivoted to a position adjacent to panel 12 to collapse the bag to a compact shape reducing wind resistance as shown in FIG. 4.

While the pivot points of bar ends 16 and 18 are advantageously mounted at the bottom of panel 12 in a manner to be explained, this is not critical to the broadest aspects of the invention. Instead, they can be mounted higher on the sides of the panel 12 to accomodate different bag constructions in the manner disclosed in the above referenced patent and application.

Figure 1:
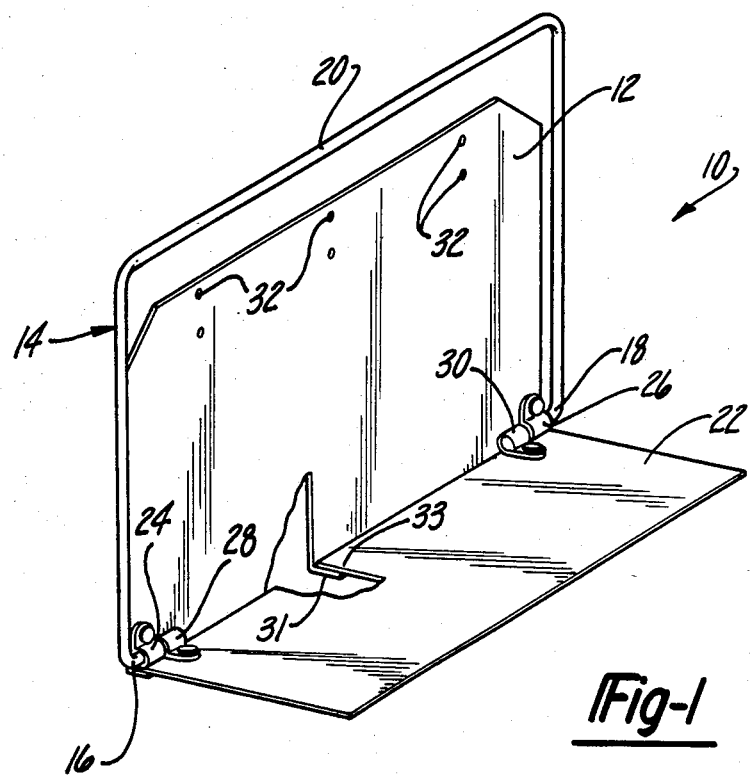
FIG. 1 is a perspective view showing the internal frame construction of one embodiment of the present invention.

In the particular embodiment shown in FIG. 1 the frame 10 includes a lower panel 22 adapted to extend substantially coextensively across the bottom of the bag. The rear edge of panel 22 is pivotally connected to the lower edge of panel 12. The opposite ends 16, 18 of bar 14 are bent parallel to the edges of the panels and used as pivot pins for pivotally connecting the panels together. A first pair of pivot mounting devices 24, 26 pivotally connect the panel 12 to outboard portions of bar ends 16 and 18, respectively. A second pair of devices 28, 30 pivotally connect panel 22 to inboard portions of bar ends 16, 18, respectively. In this embodiment devices 24-30 take the form of bushings surrounding the ends of the bar and a tongue portion suitably connected to its respective panel. Devices 24-30 could alternatively be integrally formed on their respective panels. It should be appreciated that this pivot mounting construction serves two purposes. It pivotally mounts the bar 14 to the rear panel 12 and also pivotally mounts the two panels 12, 22 together. Such an arrangement, of course, provides an efficient design requiring only a limited number of parts.

Figure 3:
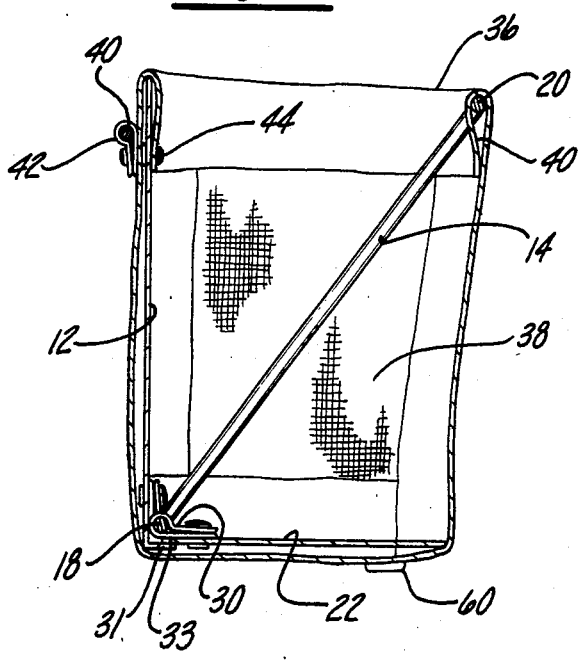
FIG. 3 is a cross-sectional view showing the pannier of FIG. 2 in an extended condition.

Pursuant to a feature of this invention one of the edges 31, 33 of the panels 12, 22, respectively, are bent to cover the edge of the other panel to thereby provide a smooth corner protecting the bag from damage. Preferably, the lower edge 31 of rear panel 12 provides this function. With this arrangement, the edge 31 provides a shelf for supporting edge 33 to rigidly hold panel 22 in a horizontal portion when folded open as shown in FIG. 3. Panel 12 also includes a series of spaced mounting holes 32.

Figure 2:
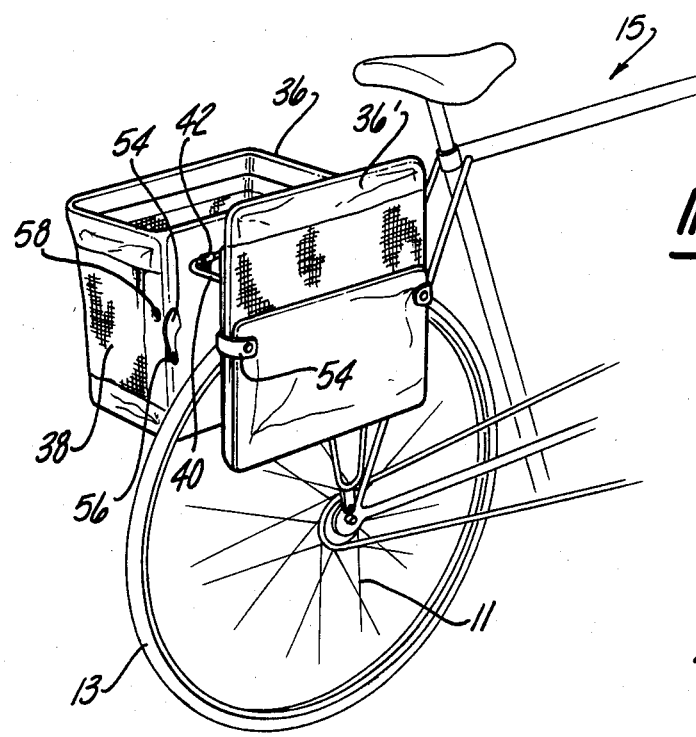
FIG. 2 is a perspective view showing panniers of one embodiment of the present invention mounted onto a carrier rack on a cycle.

Referring now to FIG. 2, frame 10 is shown utilized in conjunction with flexible open ended bags 36, 36'. Bags 36, 36' are preferably made of light weight fabric material. The bottom, rear and borders of the bags are solid to provide structural strength but the major portions of the sides and front of the bags are made of mesh-like material designated by the numeral 38. Such a construction not only decreases the weight of the bag and aids in its collapsibility but it also decreases wind resistance, of course, is of concern to the cyclist.

The frame 10 is disposed in the interior portions of the bags as shown in FIG. 3-4. The horizontally extending portion 20 of bar 14 is secured to the top forward edge of the bag in any convenient method such as by looping and stitching the border material as shown by reference numeral 40. Rear panel 12 is fixed to the rear of bag 36 in such manner as to prevent the flexible bag from interfering with the spokes of the cycle wheel and also to provide definition for the bag.

The manner of securing panel 12 to the rear of the bag may be accomplished in a variety of ways. In the embodiments shown in the drawings, the panel 12 is affixed to the bag simultaneously with securing the pannier to a rear carrier rack 40 mounted above the rear wheel of cycle 15 as shown in FIG. 2. A series of clips 42 fit over carrier rack 40 along spaced locations thereof. Suitable fastener devices 44 extending from the interior of the bag pass through the mounting holes 32 in panel 12 and project through holes in clips 42 to complete the connection. Fastener devices 44 may take the form of conventional nut and bolt arrangements.

Figure 5:
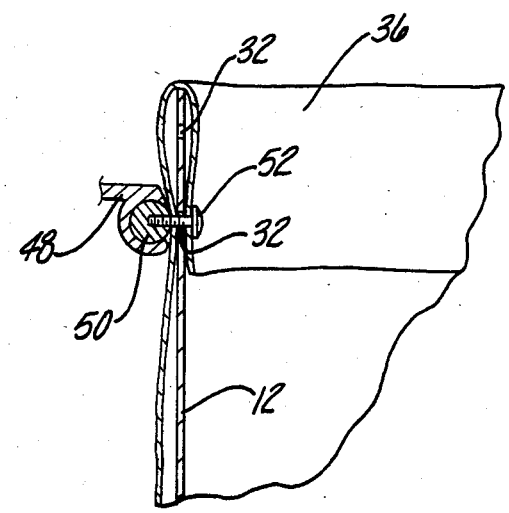
FIG. 5 is a partial cross-sectional view illustrating an alternative mounting method for the pannier.

An alternative mounting arrangement is shown in FIG. 5. There, an elongated female channel member 48 is connected to carrier rack 40 in the manner taught in the above referenced patent and application. A male slide member 50 in the form of a rod is adapted to engage channel member 48. A screw 52 is employed to assemble the various components by drawing them together when the screw is tightened.

Bags 36, 36' advantageously employ a strap 54 attached to the rear of the bag which includes a male snap member 56 on its outer end. A female snap member 58 on an adjacent side of the bag is adapted to receive member 56 when the bag is in an extended condition. Another female snap member 60 on the bottom of the bag is adapted to receive member 56 when the bag is in a collapsed position as shown most clearly in FIG. 2.

Various modifications of the foregoing pannier construction will become apparent to one skilled in the art upon a study of the foregoing specification, drawings and claims.

We claim:

1. In a pannier for a cycle having a flexible bag adapted to be secured to a carrier mounted over a wheel, the improvement comprising:
a frame for the interior of the bag, said frame including a first substantially solid panel secured to the rear of the bag and having a lower edge extending substantially to the bottom thereof, a second panel extending substantially across the bottom of the bag and being pivotal with respect to the first panel, a bar having a U-shaped section pivotally mounted adjacent the bottom of the first panel and having a central horizontally extending section secured to the top forward edge of the bag, and mounting means for mounting the first panel to the carrier whereby said first panel provides definition to the rear of the bag preventing it from interfering with the wheel, said second panel providing lateral stability for the bag, with said U-shaped bar section and second panel being pivotal to a forward position to hold said bag in an extended condition and being pivotal to a second upright position to collapse said bag.

2. In a pannier for a cycle having a flexible bag adapted to be secured to a carrier mounted over a wheel, the improvement comprising:

a frame for the interior of the bag, said frame including a first substantially solid panel secured to the rear of the bag and having a lower edge extending substantially to the bottom thereof, a second panel extending substantially across the bottom of the bag and having a rear edge pivotally connected to the lower edge of the first panel, a generally U-shaped bar having opposite ends thereof pivotally connected to opposed sides of the first panel and a central section secured to a forward upper portion of the bag, and mounting means for mounting the first panel to the carrier whereby said first panel provides definition to the rear of the bag preventing it from interferring with the wheel, said second panel providing lateral stability for the bag, with said U-shaped bar and second panel being pivotal to a forward position to hold said bag in an extended condition and being pivotal to a second upright position to collapse said bag.

3. The improvement of claim 2 wherein the opposite ends of the bar are bent parallel to the edges of the panels and are used as pivot pins for pivotally connecting the panels together.

4. The improvement of claim 3 which further comprises:

a first pair of devices pivotally connecting the first panel to said opposite ends of the bar, and a second pair of devices pivotally connecting said opposite ends of the bar to said second panel.

5. The improvement of claim 4 wherein said devices include bushings surrounding the ends of the bar and a tongue portion connected to its respective panel.

6. The improvement of claim 2 wherein one of the panels includes a bent edge covering the edge of the other panel to provide a smooth corner protecting the bag from damage.

7. The improvement of claim 2 wherein said bag is open ended at its top.

8. The improvement of claim 7 wherein major portions of the front and sides of the bag are made of mesh material thereby reducing air resistance and aiding in collapsability of the bag.

9. The improvement of claim 2 wherein said bag includes fastener means for holding the bag in its collapsed condition.

10. The improvement of claim 9 wherein said fastener means comprises a strap having one end connected to the outer rear of the bag and a first snap member on its other end; and a second snap member on the outer bottom of the bag adapted to engage said first member when the bag is pivoted to said collapsed condition, with the bottom of the bag lying generally parallel with the rear thereof.

11. The improvement of claim 2 wherein said mounting means comprises a series of holes near the top of said first panel, a series of clips for mounting on said carrier, and fastener means passing through the holes for securing said clips to said first panel.

12. The improvement of claim 2 wherein said mounting means comprises a female channel member mounted along a side of said carrier, a series of holes in the first panel, a male slide member adapted to be received in said channel, and fastener means passing via the holes in the panel into the slide member to thereby clamp the slide member to the panel.

13. The improvement of claim 2 wherein the first panel is disposed in a vertical position and includes a lower edge bent inwardly at a horizontal angle beneath the edge of the second panel thereby providing a supporting shelf for the second panel when folded open.

* * * * *